United States Patent [19]
Watanabe et al.

[11] Patent Number: 5,231,444
[45] Date of Patent: Jul. 27, 1993

[54] CAMERA SYSTEM INCLUDING REAR CONVERSION LENS

[75] Inventors: Tsuneo Watanabe, Yokohama; Yoshiharu Shiokama, Kawasaki; Yoshinari Hamanishi, Wako, all of Japan

[73] Assignee: Nikon Corporation, Tokyo, Japan

[21] Appl. No.: 804,042

[22] Filed: Dec. 9, 1991

[30] Foreign Application Priority Data

Dec. 12, 1990 [JP] Japan .................................. 2-409836

[51] Int. Cl.⁵ .............................................. G03B 3/00
[52] U.S. Cl. .................................................. 354/402
[58] Field of Search ........................ 354/402, 286, 400

[56] References Cited

U.S. PATENT DOCUMENTS

| | | | |
|---|---|---|---|
| 4,572,638 | 2/1986 | Nakai et al. | 354/286 |
| 4,841,325 | 6/1989 | Hoshino et al. | 354/402 |
| 4,881,094 | 11/1989 | Terui et al. | 354/286 |
| 4,908,645 | 3/1990 | Higashihara et al. | 354/402 |

FOREIGN PATENT DOCUMENTS 59-188622 10/1984 Japan .
62-170924 7/1987 Japan .

Primary Examiner—Michael L. Gellner
Assistant Examiner—Jae N. Noh
Attorney, Agent, or Firm—Shapiro and Shapiro

[57] ABSTRACT

A camera system and a rear conversion lens both of which accurately calculate the distance $\Delta X$ a focusing lens moves when the rear conversion lens is interposed between an interchangeable lens and the camera body, even when the distance $\Delta Bf$ an image surface of the focusing lens shifts, increases, so that a subject can be focused quickly.

A factor $K_0$ for converting the distance the image surface of an interchangeable lens shifts and a factor $C_0$ for correcting the conversion factor $K_0$ are stored, and the magnification $\beta c$ and the focal length fc of the rear conversion lens are also stored independently of the above two factors. The distance $\Delta X$ is calculated with precision. The subject can thus be automatically focused smoothly and quickly.

6 Claims, 5 Drawing Sheets

CAMERA SYSTEM INCLUDING REAR CONVERSION LENS

BACKGROUND OF THE INVENTION

1. Field of the Invention

The present invention relates to a camera system and a rear conversion lens interposed between a camera body and an interchangeable lens of the camera system.

2. Related Background Art

A type of camera system has hitherto been known which uses a method of automatically focusing a subject. In this method, light being transmitted through a photographic lens is measured. There is deviation between a predetermined focal surface of the photographic lens, that is, the surface of a film, and a surface where the subject is actually formed. The amount of such deviation, called the amount of shift of an image surface (hereinafter called simply the amount of shift), is calculated. The photographic lens, which is a focusing lens, is moved in an optical axis direction in accordance with the amount of shift. The subject is thus focused automatically. In this method, the amount of movement $\Delta X$ made by the focusing lens is expressed by the following equation:

$$\Delta X = \frac{1}{K} \cdot \Delta Bf \quad (1)$$

where $\Delta Bf$ is the amount of shift, and $K$ is a factor (conversion factor) for converting the amount of movement made by the image surface, which factor causes the amount of movement $\Delta X$ made by the focusing lens to correspond to the amount of shift $\Delta Bf$.

The conversion factor $K$ is an enormous amount of data depending on the amount of shift $\Delta Bf$, and is impractical for use in an automatic focusing device. The conversion factor $K$ is usually represented by a factor $K_0$ for converting the amount of movement made by the image surface, which factor $K_0$ corresponds to an extremely small amount of movement made by the focusing lens near a focal point and to an extremely small amount of shift. thus, $$\Delta X = \frac{1}{K_0} \Delta Bf \quad (1')$$

However, when the amount of shift $\Delta Bf$ increases, that is, when the difference between the conversion factors $K$ and $K_0$ is large, errors in the amount of movement $\Delta X$ made by the focusing lens logically increase. For this reason, the focusing lens is moved beyond the focal point or approaches but does not reach it. This makes it difficult to perform a focusing operation smoothly at a high speed.

To solve such a disadvantage, Japanese Patent Laid-Open Application No. 62-170924 discloses a method of calculating the amount of movement $\Delta X$ made by the focusing lens. In this method, instead of the conversion factor $K$, the conversion factor $K_0$ and another factor $C_0$ are introduced. As mentioned above, the factor $K_0$ corresponds to an extremely small amount of movement made by the focusing lens near the focal point and to an extremely small amount of shift. The factor $C_0$ is used for correcting the conversion factor $K_0$ in accordance with the amount of shift $\Delta Bf$. On the basis of the amount of shift $\Delta Bf$, the amount of movement $\Delta X$ made by the focusing lens is calculated from the following equation:

$$\Delta X = \frac{1}{K_0 (1 + C_0 \cdot \Delta Bf)} \cdot \Delta Bf \quad (2)$$

Because of this simple operation expression, even when the amount of shift $\Delta Bf$ is relatively large, the amount of movement $\Delta X$ made by the focusing lens is calculated with a high degree of precision, thus solving the above problem of the focusing lens moving beyond the focal point or approaching but not reaching it. In addition, the focusing operation can be carried out smoothly at a high speed.

Equation (2) holds true when an interchangeable lens is attached directly to a camera body. However, it does not hold true any longer when a rear conversion lens is interposed between the camera body and the interchangeable lens. This is because the conversion factor $K_0$ and the correction factor $C_0$ are data specific to only the interchangeable lens. The automatic focusing device therefore does not function normally.

To solve this problem, an automatic focusing device disclosed in Japanese Patent Laid-Open Application No. 59-188622 has been proposed. This device calculates the amount of movement $\Delta X$ made by a focusing lens in the following manner. In the case of an optical system having a rear conversion lens, the factor $K_0$ for converting the amount of movement made by the image surface is converted to the following equation:

$$K_0' = K_0 \times \left(\frac{f_{MC}}{f_M}\right)^2 = K_0 \times \beta c^2 \quad (3)$$

where $F_M$ = focal length of only the interchangeable lens
$f_{MC}$ = focal length of a composite lens including the interchangeable and rear conversion lenses
$\beta c$ = magnification of the rear conversion lens When the rear conversion lens is used, the amount of movement $\Delta X$ made by the focusing lens, which is the interchangeable lens, is calculated from the following equation, which is converted from equation (1):

$$\Delta X = \frac{1}{K_0'} \Delta Bf = \frac{\Delta Bf}{K_0 \times \beta c^2} \quad (1'')$$

However, when the equation (1'') is used to calculate the amount of movement $\Delta X$ made by the focusing lens, the same problem occurs as that mentioned in the conventional art, i.e., when the amount of shift $\Delta Bf$ increases, errors in the amount of movement $\Delta X$ made by the focusing lens logically increase. For this reason, the focusing lens is moved beyond the focal point or approaches but does not reach it. This makes it difficult to perform the focusing operation smoothly at a high speed.

Also, even if the amount of movement $\Delta X$ made by the focusing lens is calculated from equation (2), to which equation (3) is applied, where only the conversion factor $K_0$ is changed for the rear conversion lens, the conversion factor $K_0$ is not corrected thoroughly when the rear conversion lens is used. This is because the correction factor $C_0$ in equation (2) is a factor used only with the interchangeable lens. When the amount of shift ΔBf increases, errors in the amount of movement ΔX made by the focusing lens logically increase.

SUMMARY OF THE INVENTION

An object of the present invention is to provide a camera system which accurately calculates the amount of movement ΔX made by a focusing lens when a rear conversion lens is interposed between an interchangeable lens and a camera body, even when the amount of shift ΔBf of an image surface of the focusing lens increases, so that a subject can be focused quickly.

In accordance with one aspect of this invention, there is provided a camera system comprising: a camera body; an interchangeable lens; a rear conversion lens interposed between the camera body and the interchangeable lens; focus detecting means for measuring luminous flux being transmitted through a focusing optical system to detect the amount of shift ΔBf of an image surface between a predetermined focal surface and a surface where a subject is actually formed into an image; first information storing means for retaining a factor $K_0$ and another factor $C_0$, the factor $K_0$ being used for converting the amount of movement made by a specific image surface and being represented by a ratio of an extremely small amount of movement made by the image surface to an extremely small amount of movement made by the focusing optical system, the factor $C_0$ being used for correcting the factor $K_0$ in accordance with the amount of shift ΔBf of the image surface; control means for calculating, on the basis of the factor $K_0$ and the amount of shift ΔBf of the image surface, the amount of movement ΔX made by the focusing optical system until the subject is focused and for driving controllably the focusing optical system by the amount of movement ΔX; and second information storing means, which is provided in the rear conversion lens, for retaining information regarding magnification $\beta c$ and a focal length fc of the rear conversion lens and for outputting the information to the control means.

In accordance with another aspect of this invention, there is provided a rear conversion lens interposed between a camera body and an interchangeable lens of a camera system, the camera system comprising: focus detecting means for measuring luminous flux being transmitted through a focusing optical system to detect the amount of shift ΔBf of an image surface between a predetermined focal surface and a surface where a subject is actually formed into an image; first information storing means for retaining a factor $K_0$ and another factor $C_0$, the factor $K_0$ being used for converting the amount of movement made by a specific image surface and being represented by a ratio of an extremely small amount of movement made by the image surface to an extremely small amount of movement made by the focusing optical system, the factor $C_0$ being used for correcting the factor $K_0$ in accordance with the amount of shift ΔBf of the image surface; and control means for calculating, on the basis of the factor $K_0$ and the amount of shift ΔBf of the image surface, the amount of movement ΔX made by the focusing optical system until the subject is focused and for driving controllably the focusing optical system by the amount of movement ΔX; the rear conversion lens comprising second information storing means for retaining information regarding magnification $\beta c$ and a focal length fc of the rear conversion lens and for outputting the information to the control means.

There is provided a camera system wherein a factor $K_0'$ for converting the amount of movement made by the image surface of the composite, which composite includes the interchangeable lens and the rear conversion lens, and a factor $C_0'$ for correcting the factor $K_0'$ are calculated from the following equation based on the factor $K_0$ and the factor $C_0$, and the magnification $\beta c$ and the focal length fc of the rear conversion lens:

$$C_0' = \frac{C_0}{\beta c^2} - \frac{1}{fc \cdot \beta c} \quad (4)$$

There is also provided a camera system wherein the amount of movement ΔX made by the focusing optical system is calculated from the following equation:

$$\Delta X = \frac{\Delta Bf}{K_0' (1 + C_0' \cdot \Delta Bf)} \quad (2')$$

There is provided a rear conversion lens wherein a factor $K_0'$ for converting the amount of movement made by the image surface of the composite, which composite includes the interchangeable lens and the rear conversion lens, and a factor $C_0'$ for correcting the factor $K_0'$ are calculated from the following equation based on the factor $K_0$ and the factor $C_0$, and the magnification $\beta c$ and the focal length fc of the rear conversion lens:

$$C_0' = \frac{C_0}{\beta c^2} - \frac{1}{fc \cdot \beta c}$$

There is also provided a rear conversion lens wherein the amount of movement ΔX made by the focusing optical system is calculated from the following equation:

$$\Delta X = \frac{\Delta Bf}{K_0' (1 + C_0' \cdot \Delta Bf)}$$

According to this invention, the factor $K_0$ and the factor $C_0$ are stored, and the magnification $\beta c$ and the focal length fc, both being optical data specific to the rear conversion lens, are also stored independently of the above two factors. When the rear conversion lens is interposed between the interchangeable lens and the camera body, the factor $K_0'$, for converting the amount of movement made by the image surface of a composite optical system including the two types of lenses, and the factor $C_0'$, for correcting the conversion factor $K_0'$, can be calculated on the basis of the four basic arithmetic calculations.

Once the camera system calculates the amount of shift ΔBf of an image surface of a focusing lens, it uses the same operation expression as that used with only the interchangeable lens to calculate the amount of movement ΔX made by the focusing lens. This calculation is based on the amount of shift ΔBf, the conversion factor $K_0'$, and the correction factor $C_0'$.

DESCRIPTION OF THE PREFERRED EMBODIMENTS

Equations (3) and (4) will be described which are used to convert a factor $K_0$ and a factor $C_0$ to another factor $K_0'$ and another factor $C_0'$. The factor $K_0$ converts the amount of movement made by an image surface of an interchangeable lens, and is used for only the interchangeable lens when a rear conversion lens of the present invention is attached to a camera body. The factor $C_0$ corrects the conversion factor $K_0$ in accordance with the amount of shift $\Delta Bf$ of an image surface (hereinafter referred to simply as the amount of shift $\Delta Bf$). The above conversion is based on optical data specific to the rear conversion lens.

Figure 1A:
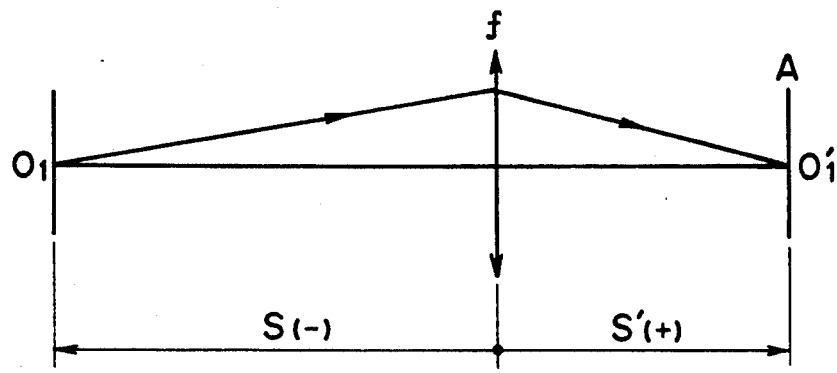
FIGS. 1A to 1C are views each showing an optical arrangement which is used to determine a relation between the amount of shift ΔBf of an image surface and the amount of movement ΔX made by a lens.

FIG. 1A is a view of an optical arrangement showing a subject located at a position $O_1$ ($S_{(-)}$ from a focusing lens having a focal length of f), and an image of the subject focused by the focusing lens on a predetermined focus surface A, for example, on the surface of a film (position $O_1'$).

Figure 1B:
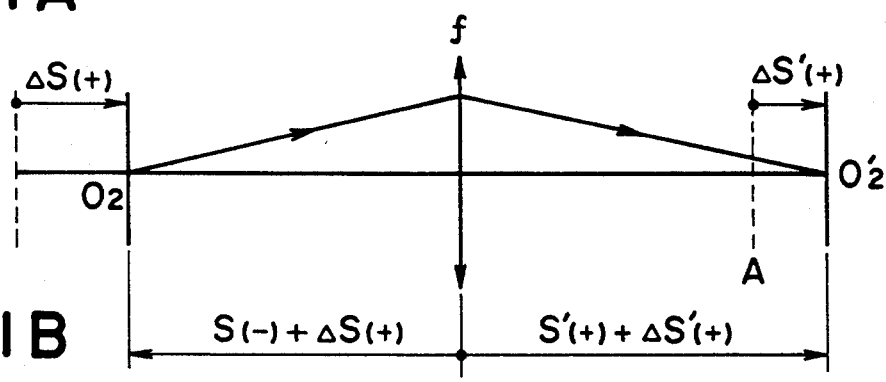
Figure 1C:
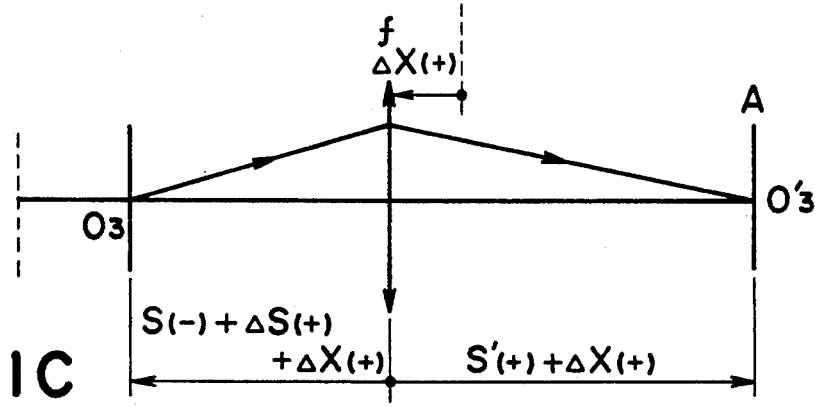

FIG. 1B is a view showing an optical arrangement in which the subject moves by only $\Delta S_{(+)}$ from the position $O_1$ to a position $O_2$. At this time, the image of the subject is formed on a position $O_2'$ which is away from the predetermined focus surface A by only $\Delta S'_{(+)}$. FIG. 1 C is a view showing an optical arrangement in which when the subject is in the position $O_2$ in FIG. 1B, (which is euqal to a position $O_3$ in FIG. 1C), the focusing lens is moved by only $\Delta S_{(+)}$ to form the image of the subject onto the focus surface A (position $O_3'$).

A lens formula is used to represent the optical systems shown in FIGS. 1A and 1B as follows:

$$\frac{1}{S'} - \frac{1}{S} = \frac{1}{f} \tag{5}$$

$$\frac{1}{S' + \Delta S'} - \frac{1}{S + \Delta S} = \frac{1}{f} \tag{6}$$

$$\beta = \frac{S'}{S} \text{ (magnification)} \tag{7}$$

When S and S' are eliminated from equations (5), (6) and (7), the following equation is obtained:

$$\Delta S = \frac{\Delta S'}{\beta^2 \left(1 - \frac{\Delta S'}{\beta \cdot f}\right)} \tag{8}$$

A lens formula is used to represent the optical system shown in FIG. 1C as follows:

$$\frac{1}{S' + \Delta X} - \frac{1}{S + \Delta S + \Delta X} = \frac{1}{f} \tag{9}$$

When S and S' are eliminated from equations (5), (7) and (9), we have the following equation which is the same equation as equation (8), where $\Delta S$ is replaced by $\Delta S + \Delta X$ and $\Delta S'$ is replaced by $\Delta X$:

$$\Delta S = \frac{\Delta X \left\{ 1 - \beta^2 \left(1 - \frac{\Delta X}{f \cdot \beta}\right)\right\}}{\beta^2 \left(1 - \frac{\Delta X}{f \cdot \beta}\right)} \tag{10}$$

When $\Delta S$ is eliminated from equation (10) and infinitesimal items are ignored and when it is assumed that $$\left|\frac{\Delta X}{f}\right| << \left|\frac{(1 - \beta^2)}{\beta}\right|$$

then the following approximate value is obtained:

$$\Delta X \simeq \frac{1}{(1 - \beta^2)} \times \frac{\Delta S'}{\left\{1 + \Delta S' \cdot \frac{\beta\left(1 + \frac{1}{1 - \beta^2}\right)}{(1 - \beta^2) \cdot f}\right\}} \tag{11}$$

where $\Delta X$ is the amount of movement made by the focusing lens, and $\Delta S'$ is the amount of shift $\Delta Bf$. When the following replacement is established, that is, $$K_0 = 1 - \beta^2 \tag{11A}$$

$$C_0 = \frac{\beta\left(1 + \frac{1}{1 - \beta^2}\right)}{(1 - \beta^2) \cdot f} \tag{11B}$$

then equation (11) becomes exactly the same as equation (2). Thus an equation can be obtained which is used to calculate the amount of movement $\Delta X$ made by the focusing lens when only an interchangeable lens is attached to the camera body. This calculation is based on the amount of shift $\Delta Bf$.

Figure 2A:
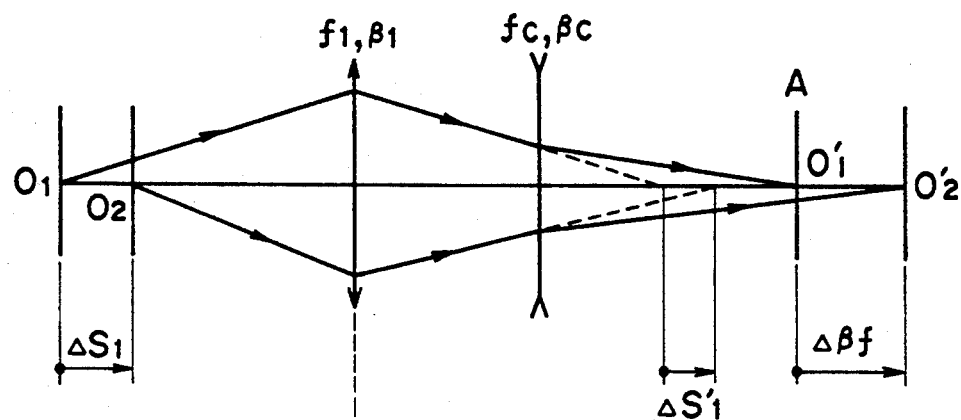
FIGS. 2A and 2B are views each showing an optical arrangement which is used to determine a relation between the amount of shift $\Delta Bf$ of an image surface and the amount of movement $\Delta X$ made by a lens when a rear conversion lens is used.

The relationship will be described between the amount of shift $\Delta Bf$ and the amount of movement $\Delta X$ made by the focusing lens when the rear conversion lens is interposed between the interchangeable lens and the camera body. FIG. 2A is a view showing an optical arrangement of a focusing lens having a focal length of fl and a rear conversion lens having a focal length of fc. The image of a subject at a position $O_1$ is focused on a predetermined focus surface A, for example, on the surface of a film. The subject moves to a position $O_2$ by $\Delta S_1$, and the image of this subject is formed on a position $O'_2$, which deviates from the predetermined focus surface A by $\Delta Bf$.

Figure 2B:
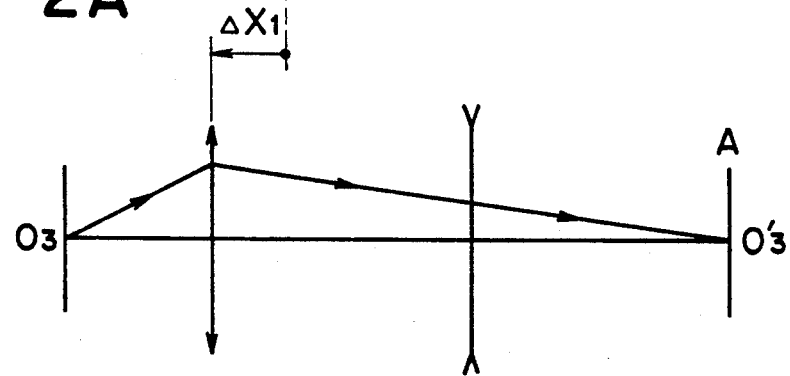

FIG. 2B is a view showing an optical arrangement in which when the subject is in the position $O_2$ in FIG. 2A (which is equal to a position $O_3$ in FIG. 2B), the focusing lens is moved by only $\Delta X_1$, and the image of this subject is formed on the predetermined focus surface A (position $O'_3$). When equation (11) is applied in the case of the focusing lens, the following equation is obtained:

$$\Delta X_1 \simeq \frac{1}{(1-\beta_1^2)} \times \frac{\Delta S_1'}{\left\{ 1 + \Delta S_1' \cdot \frac{\beta_1\left(1 + \frac{1}{1-\beta^2}\right)}{(1-\beta_1^2) \cdot f_1} \right\}} \quad (12)$$

When equation (8) is applied in the case of the rear conversion lens, the following equation is established:

$$\Delta S_1' = \frac{\Delta Bf}{\beta c^2 \left(1 - \frac{\Delta Bf}{fc \cdot \beta c}\right)} \quad (13)$$

When $\Delta S_1'$ is eliminated from equations (12) and (13), the following equation is obtained ultimately:

$$\Delta X_1 \simeq \frac{1}{(1-\beta_1^2)\beta c^2} \times \quad (14)$$

$$\frac{\Delta Bf}{1 + \Delta Bf \cdot \left[\frac{\beta_1\left(1 + \frac{1}{1-\beta^2}\right)}{(1-\beta_1^2)\beta c^2 \cdot f_1} - \frac{1}{fc \cdot \beta c}\right]}$$

Equation (14) is an equation used to calculate the amount of movement $\Delta X$ made by the focusing lens until the subject is focused. This calculation is based on the amount of shift $\Delta Bf$.

Equation (14) will be discussed in detail. When $$\begin{bmatrix} K_0' = (1-\beta_1^2)\beta c^2 & (15) \\ \text{and} & \\ C_0' = \frac{\beta_1\left(1 + \frac{1}{1-\beta^2}\right)}{(1-\beta_1^2)\beta c^2 f_1} - \frac{1}{fc \cdot \beta c} & (16) \end{bmatrix}$$

then equation (14) can be expressed as follows:

$$X_1 = \frac{1}{K_0'(1 + C_0' \cdot \Delta Bf)} \cdot \Delta Bf \quad (14')$$

When equation (14') is compared with equation (2), these equations have the same form, and only constants determined by data specific to the optical system are different. That is, the conversion factor $K_0$ and the correction factor $C_0$ in equation (2) are different from those in equation (14'). In this way, the same method can be used in two camera systems to calculate the amount of movement $\Delta X$ made by the focusing lens until the subject is focused, except that the conversion factor $K_0$ and the correction factor $C_0$ for the conversion factor $K_0$ change. The first camera system includes an interchangeable lens and a camera body, and the second camera system includes an interchangeable lens, a rear conversion lens and a camera body. The calculation mentioned above is based on the amount of shift $\Delta Bf$. It is sufficient to provide means for calculating the amount of movement $\Delta X$ made by the focusing lens. The calculating means may be disposed, for example, in a portion inside the camera body, regardless of the optical system with either only an interchangeable lens or with interchangeable and rear conversion lenses.

In the same manner as with the interchangeable lens, the correction factor $C_0'$ is used to calculate the amount of movement made by the focusing lens of an optical system with the rear conversion lens. Because of the use of the correction factor $C_0'$, such an amount is calculated as accurately as with the interchangeable lens. The conversion factor $K_0$ and the factor $C_0$ for correcting the conversion factor $K_0$ will be described in the case of a camera system including the rear conversion lens. When equations (11A) and (11B) are compared with equations (15) and (16), the following equation is obtained:

$$\begin{bmatrix} K_0' = K_0 \cdot \beta c^2 & (17) \\ C_0' = \frac{C_0}{\beta c^2} - \frac{1}{fc \cdot \beta c} & (18) \end{bmatrix}$$

where $K_0$ is the conversion factor; $C_0$ is the factor for correcting the conversion factor $K_0$ when only the interchangeable lens is used; $\beta c$ is a magnification value; and $fc$ is a focal length, $\beta c$ and $fc$ being optical data specific to the rear conversion lens.

Thus, in the case of a camera system including the intercahngeable and rear conversion lenses, the conversion factor $K_0'$, and the correction factor $C_0'$ are calculated by the conversion factor $K_0$ and the correction factor $C_0$, both of which are used in the case of a camera system including only the interchangeable lens, and by $fc$ and $\beta c$, which are optical data specific to the rear conversion lens. Since optical data available with only the interchangeable lens is completely separated from optical data available with the conversion lens, it is not necessary to process $K_0$ and $C_0$ in order to calculate $K_0'$ and $C_0'$. In other words, $K_0$ and $C_0$ are stored as data specific to the interchangeable lens, and $\beta c$ and $fc$ are stored as data specific to the rear conversion lens. $K_0$ and $C_0$ are retained in the interchangeable lens, and $\beta c$ and $fc$ are retained in the rear conversion lens.

In FIGS. 1A to 1C and 2A and 2B, it is assumed that one interchangeable lens group is used as one focusing lens group. However, equation (2) is construed as approximately true when a plurality of interchangeable lens groups are used as focusing lens groups, even when such groups constitute all or part of an optical system with the interchangeable lenses. Therefore, equation (2') usually holds true when equations (3) and (4) are applied in the case of the rear conversion lens attached to a camera body.

To demonstrate suitability of the present invention on the basis of the above theory, an example is shown in which the amount of movement $\Delta X$ made by the focusing lens is calculated from the amount of shift $\Delta Bf$.

Table 1 shows the amounts of movement made by a zoom lens, used as the focusing lens, of a camera system, the zoom lens being actually attached to the camera body.

TABLE 1

| Positions of Subject | Positions of Focusing Lens | Focusing Position for Far Point Amount of Extension x = 0 | Focusing Position for Intermediate Point Amount of Extension x = 1.615 | Focusing Position for Near Point Amount of Extension x = 8.474 |
|---|---|---|---|---|
| Far Point | K | 1.065 | 1.017 | 0.852 |
| | ΔBf | 0 | −1.642 | −7.220 |
| | ΔX | | | |
| | A | 0 | −1.615 | −8.474 |
| | B | 0 (0%) | −1.549 (4.1%) | −6.811 (19.6%) |
| | C | 0 (0%) | −1.615 (0%) | −8.312 (1.9%) |
| Intermediate Point | K | 1.117 | 1.064 | 0.885 |
| | ΔBf | 1.804 | 0 | −6.070 |
| | ΔX | | | |
| | A | 1.615 | 0 | −6.859 |
| | B | 1.702 | 0 (0%) | −5.726 (16.5%) |
| | C | 1.628 | 0 (0%) | −6.751 (1.6%) |
| Near Point | K | 1.367 | 1.288 | 1.034 |
| | ΔBf | 11.584 | 8.834 | 0 |
| | ΔX | | | |
| | A | 8.474 | 6.859 | 0 |
| | B | 10.928 (29.0%) | 8.334 (21.5%) | 0 (0%) |
| | C | 8.474 (0%) | 6.826 (0.5%) | 0 (0%) |

First, three positions of subjects and three positions of focusing lens are selected. At each position the amount of shaft ΔBf is calculated from equation (1) based on the factor K for converting the amount of movement made by an image surface and on the amount of movement ΔX made by the focusing lens. Symbol ΔX(A) represents the amounts of movement made by the focusing lens until the subject is focused. Then, the conversion factor K is represented by a value obtained near a focal point; in this embodiment $K_0 = 1.06$. Symbol ΔX(B) represents the amounts of movement made by the focusing lens. These amounts are calculated from equation (1') on the basis of the amount of shift ΔBf at each position. Symbol ΔX(C) represents the amounts of movement made by the focusing lens. These amounts are calculated from equation (2), where $K_0 = 1.06$ and $C_0 = 1/40$, which is a correction factor proposed by Japanese Patent Laid-Open No. 62-170924, on the basis of the amount of shift ΔBf at each position. Values enclosed in parentheses in the rows of ΔX(B) and ΔX(C) are errors in the amounts of movement ΔX(B) and ΔX(C) made by the focusing lens with respect to the correct amount of movement ΔX(A) made by the focusing lens in a paraxial system. It is obvious from Table 1 that errors in ΔX(C) are much smaller than those in ΔX(B) and that the correction factor $C_0$ produces an advantageous effect.

Table 2 shows the amounts of movement made by the zoom lens of a camera system including a rear conversion lens (tele-conversion lens in this embodiment) interposed between the zoom lens and the camera body.

TABLE 2

| Positions of Subject | Positions of Focusing Lens | Focusing Position for Far Point Amount of Extension x = 0 | Focusing Position for Intermediate Point Amount of Extension x = 1.615 | Focusing Position for Near Point Amount of Extension x = 8.474 |
|---|---|---|---|---|
| Far Point | K | 2.178 | 2.030 | 1.575 |
| | ΔBf | 0 | −3.278 | −13.347 |
| | ΔX | | | |
| | A | 0 | −1.615 | −8.474 |
| | B | 0 (0%) | −1.512 (6.4%) | −6.156 (27.4%) |
| | C | 0 (0%) | −1.615 (0%) | −8.308 (2.0%) |
| Intermediate Point | K | 2.346 | 2.175 | 1.662 |
| | ΔBf | 3.789 | 0 | −11.400 |
| | ΔX | | | |
| | A | 1.615 | 0 | −6.859 |
| | B | 1.748 (8.2%) | 0 (0%) | −5.258 (23.3%) |
| | C | 1.628 (0.8%) | 0 (0%) | −6.752 (1.6%) |
| Near Point | K | 3.369 | 3.027 | 2.115 |
| | ΔBf | 28.549 | 20.762 | 0 |
| | ΔX | | | |
| | A | 8.474 | 6.859 | 0 |
| | B | 13.168 (55.4%) | 9.577 (39.6%) | 0 (0%) |
| | C | 8.474 (0%) | 6.826 (0.5%) | 0 (0%) |

In Table 2, symbol K indicates the factor for converting the amount of movement made by an image surface. The conversion factor K is calculated again when a zoom lens optical system and a tele-conversion lens system are combined into one optical system. The same calculating method is used as that used in Table 1. As regards ΔX(B), the conversion factor $K_0'$ is expressed by the following equation using equation (3):

$$K_0' = K_0 \cdot \beta c^2 = 1.06 \times 1.43^2 = 2.168$$

This is the calculating method disclosed in Japanese Patent Laid-Open Application No. 59-188622. As regards $\Delta X(C)$ the conversion factor $K_0'$ and the correction factor $C_0'$ are expressed by the following equation using equations (3) and (4) of this invention:

$$K_0' = K_0 \cdot \beta c^2 = 1.06 \times 1.43^2 = 2.168$$

$$C_0' = \frac{C_0}{\beta c^2} - \frac{1}{fc \cdot \beta c}$$

$$= \frac{1}{40 \times 1.43^2} - \frac{1}{(-97.384) \times 1.43}$$

$$= \frac{1}{51.5}$$

It is understood that a method of converting the conversion factor $K_0$ and the correction factor $C_0$ for the conversion factor $K_0$ are correct and accurate. This converting method is based on the equations (3) and (4), where $\Delta X(A)$ is compared with $\Delta X(C)$. It is also understood that, when $\Delta X(A)$ is compared with $\Delta X(C)$, there are much smaller errors in a method in which the correction factor $C_0'$, corresponding to a rear conversion lens, is used to calculate the amount of movement $\Delta X$ made by the focusing lens when the rear conversion lens is attached to the camera body. This calculation is based on the amount of shift $\Delta Bf$.

Figure 3:
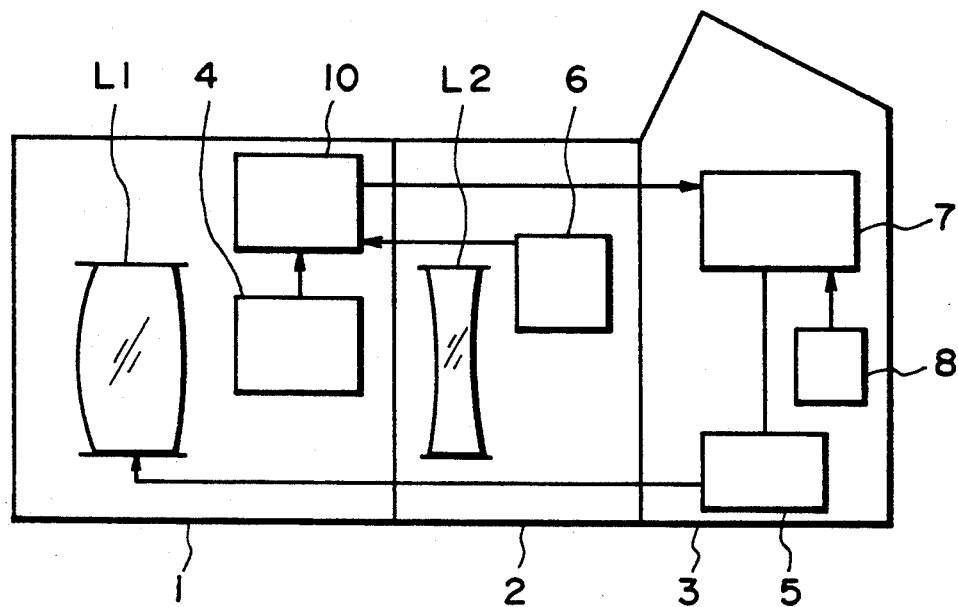
FIG. 3 is a schematic view showing the concept of a first embodiment of the present invention.

An embodiment will now be described in which this invention is applied to an AF camera. In FIG. 3, numeral 1 denotes an interchangeable lens; 2, a rear conversion lens; and 3, a camera body. The rear conversion lens 2 is interposed between the interchangeable lens 2 and the camera body 3. A focusing lens group L1, an information storage device 4 and a converter 10 are arranged in the interchangeable lens 1. The information storage device 4 is used to store the conversion factor $K_0$ and the factor $C_0$ for correcting the conversion factor $K_0$ when only the interchangeable lens 1 is used. The converter 10 is used to read information regarding the interchangeable and rear conversion lenses and to compute the information, that is, to calculate $K_0'$ and $C_0'$ from equations (3) and (4).

As described previously, the focusing lens group L1 may constitute all or part of an optical system having the interchangeable lens, and may be composed of a plurality of groups. A rear conversion lens group L2 and an information storage device 6 are disposed in the rear conversion lens 2. The information storage device 6 stores a magnification value $\beta c$ and a focal length fc, both being optical data specific to the rear conversion lens. A control device 7, a driving device 5 for driving the focusing lens group L1 in an optical axis direction, and a focus detecting device 8 for calculating the amount of shift $\Delta Bf$, are all arranged in the camera body 3. The control device 7 reads information, that is, $K_0'$ and $C_0'$, converted when the interchangeable and rear conversion lenses are attached to the camera body 3. The control device 7 calculate the amount of movement made by the focusing lens group based on the amount of shift $\Delta Bf$, and issues a lens driving command.

The operation of this embodiment will be described. First, the converter 10 inside the interchangeable lens 1 reads from the information storage device 4 the conversion factor $K_0$ and the correction factor $C_0$ when only the interchangeable lens 1 is used. The converter 10 further reads from the information storage device 6 optical data of the rear conversion lens, that is, the magnification $\beta c$ and the focal length fc. Then, it calculates the conversion factor $K_0'$ and the correction factor $C_0'$ in accordance with equations (3) and (4). The converter 10 transmits these factors to the control device 7 inside the camera body 3. These factors are used for a composite including the interchangeable and rear conversion lenses. The control device 7 calculates the amount of movement $\Delta X$ made by the focusing lens until the subject is focused. This calculation is based on equation (2'), the conversion factor $K_0'$, the correction factor $C_0'$ and on the amount of shift $\Delta Bf$, which amount is transmitted from the focus detecting device 8. Then the driving device 5 inside the camera body 3 moves the focusing lens group L1 by only $\Delta X$ so that the subject is focused. As shown in Table 2, because a few errors are actually present in the amount of movement $\Delta X$ made by the focusing lens, in some cases the above operation is repeated, that is, the amount of shift $\Delta Bf$ is calculated a plurality of times to drive the focusing lens group L1 until the subject is focused. When the rear conversion lens is not used, that is, when data cannot be read from the information storage device 6, the converter 10 transmits directly to the control device 7 the conversion factor $K_0$ and the correction factor $C_0$ instead of the conversion factor $K_0'$ and the correction factor $C_0'$.

Figure 4:
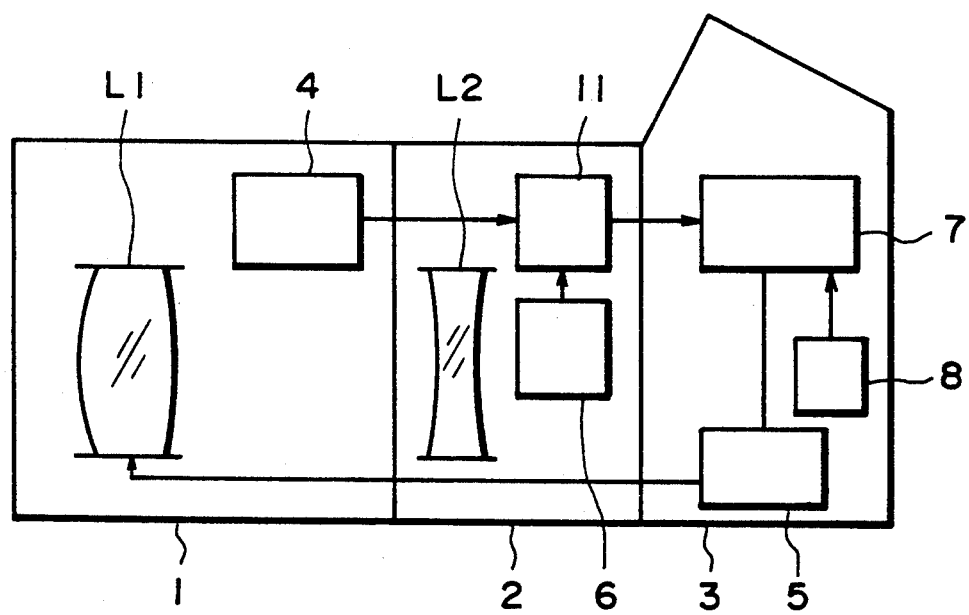
FIG. 4 is a schematic view showing the concept of a second embodiment.
Figure 5:
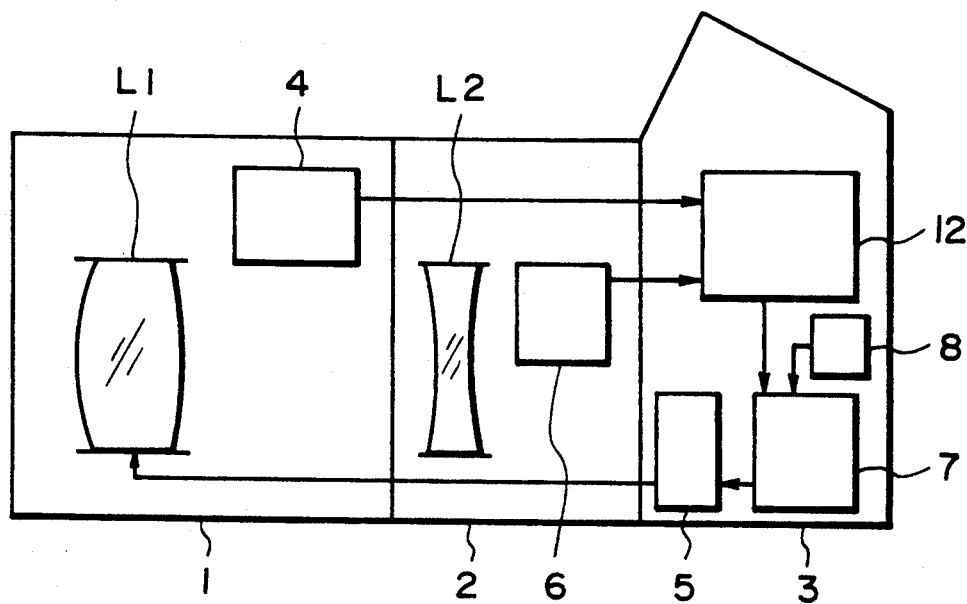
FIG. 5 is a schematic view showing the concept of a third embodiment.

FIG. 4 shows a second embodiment of this invention. The structure of the second embodiment is the same as that of the first embodiment, except that a converter 11 is disposed in a rear conversion lens 2. The converter 11 calculates the conversion factor $K_0'$ and the correction factor $C_0'$ when the rear conversin lens 2 is used. FIG. 5 shows a third embodiment of this invention. The structure of the third embodiment is the same as those of the first and second embodiments, except that a converter 12 is disposed in a camera body 3. The converter 12 calculates the conversion factor $K_0'$ and the correction factor $C_0'$ when a rear conversion lens 2 is used. The operations of the second and third embodiments are exactly the same as that of the first embodiment. The conversion factor $K_0$ and the correction factor $C_0'$ used only with the interchangeable lens, the magnification value $\beta c$ and the focal length fc, both being optical data specific to the rear conversion lens, are all transmitted to the converter 11 in the rear conversion lens 2 or the converter 12 in the camera body 3. The conversion factor $K_0$ and the correction factor $C_0$ are converted to the conversion factor $K_0'$ and the correction factor $C_0'$. The latter factors $K_0'$ and $C_0'$ are transmitted to the control device 7 inside the camera body 3.

Figure 6:
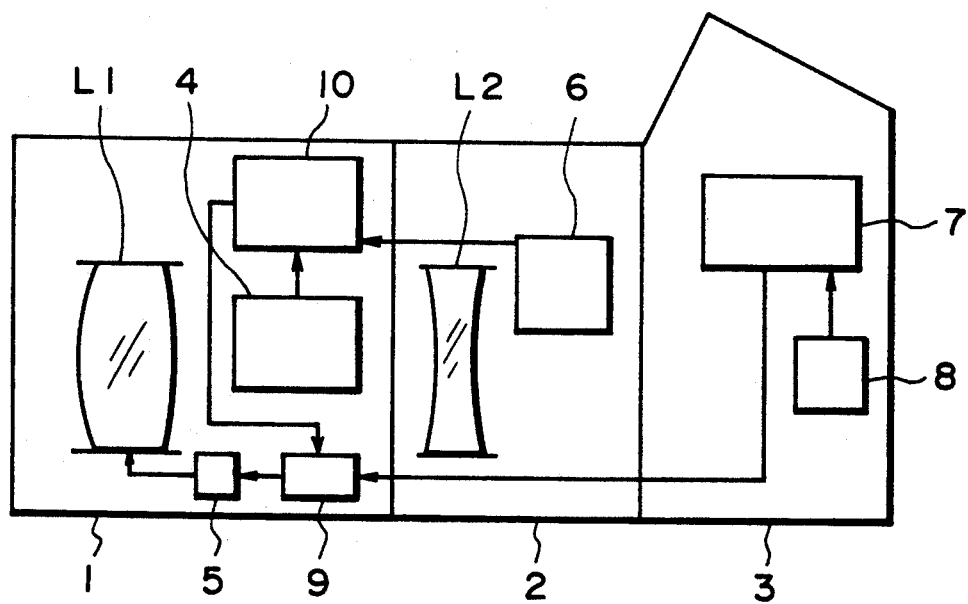
FIG. 6 is a schematic view showing the concept of a fourth embodiment.
Figure 7:
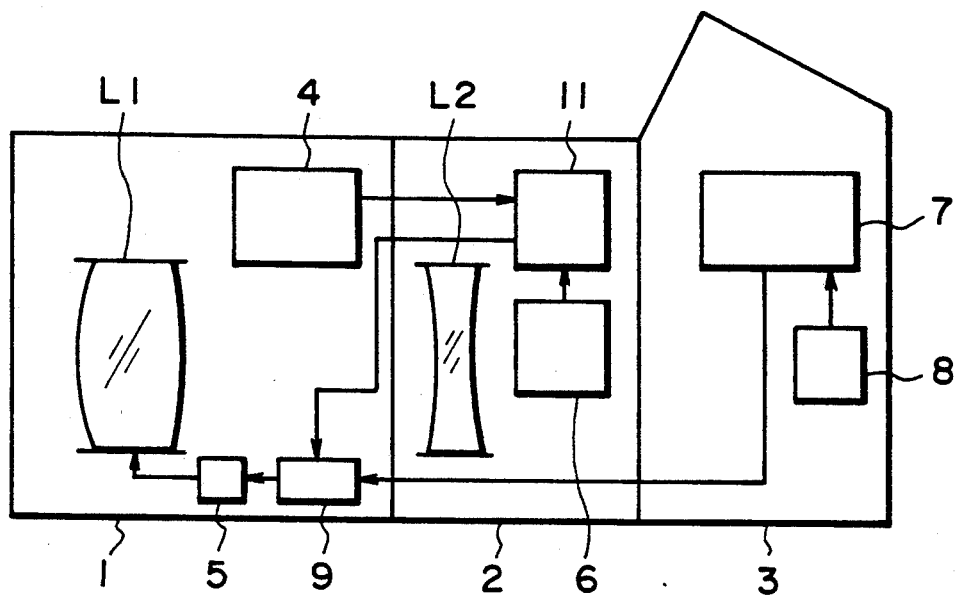
FIG. 7 is a schematic view showing the concept of a fifth embodiment.
Figure 8:
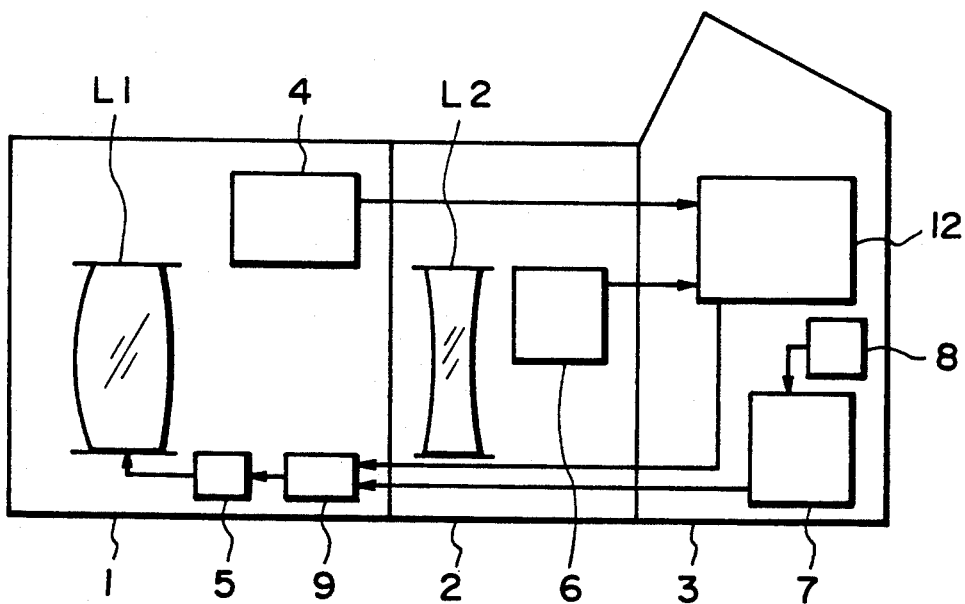
FIG. 8 is a schematic view showing the concept of a sixth embodiment.

The present invention is applied to the embodiments shown in FIGS. 3 and 4, in which the control device 7 in the camera body 3 calculates the amount of movement $\Delta X$ made by the focusing lens. This calculation is based on the amount of shift $\Delta Bf$, the conversion factor $K_0'$ and the correction factor $C_0'$, both factors having been converted. This invention, however, is not limited to the above embodiments, and may be applied to embodiments shown in FIGS. 6 through 8. In these embodiments, a driving device 5 and means 9 for calculating the amount of movement $\Delta X$ may be provided in an interchangeable lens 1. In an embodiment shown in FIG. 6, the amount of shift $\Delta Bf$ is transmitted from a camera body 3 to the calculating means 9 in the interchangeable lens, and the conversion factor $K_0'$ and the correction factor $C_0'$ are transmitted from the interchangeable lens to the calculating means 9. In an embodiment shown in FIG. 7, the conversion factor $K_0'$ and the correction factor $C_0'$ are transmitted from a rear conversion lens to the calculating means 9 in the interchangeable lens. In an embodiment shown in FIG. 8, the conversion factor $K_0'$ and the correction factor $C_0'$ are transmitted from the camera body to the calculating means 9 in the interchangeable lens. In the embodiments shown in FIGS. 6 through 8, the operation of a control device 7 inside the camera body is reduced since in the camera body transmits only the amount of shift $\Delta Bf$. In the embodiment shown in FIG. 6, means for communication can be simplified because means for calculating the conversion factor $K_0'$ and the correction factor $C_0'$ is disposed in the interchangeable lens.

According to this invention, the factor $K_0$ for converting the amount of movement made by the image surface of an interchangeable lens and the factor $C_0$ for correcting the conversion factor $K_0$ are stored, and the magnification value $\beta c$ and the focal length fc, both being optical data specific to the rear conversion lens, are also stored independently of the above two factors. When a rear conversion lens is interposed between the interchangeable lens and the camera body, the conversion factor $K_0$ is converted to another factor $K_0'$, for converting the amount of movement made by the image surface of a composite optical system including the two types of lenses, and the correction factor $C_0$ is converted to another factor $C_0'$, for correcting the conversion factor $K_0'$. The latter factors $K_0'$ and $C_0'$ can be calculated quickly on the basis of only the four basic arithmetic calculations.

Once a camera system calculates the amount of shift $\Delta Bf$ of an image surface of a focusing lens, it calculates the amount of movement $\Delta X$ made by the focusing lens. This calculation is based on the amount of shift $\Delta Bf$, the conversion factor $K_0'$, and the correction factor $C_0'$. The same operation expression is used to calculate the amount of movement $\Delta X$, regardless of a type of an optical system, thus making the camera system versatile. Even when a rear conversion lens and various types of interchangeable lenses are combined, it is not necessary to perform a very complicated and impractical operation, that is, to calculate beforehand the conversion factor $K_0'$ and the correction factor $C_0'$ and to store these factors as data.

Since the correction factor $C_0'$ is introduced in accordance with a rear conversion lens being used, the amount of movement $\Delta X$ made by the focusing lens can be calculated with precision. The focusing lens is moved to a point extremely near a focal point when it is moved first. The subject can thus be focused smoothly and quickly.

The same operation expression is used regardless of the method by which an interchangeable lens focuses the subject, that is, regardless of whether a focusing lens group constitutes all or part of an optical system having an interchangeable lens or whether a plurality of focusing lens groups are used. This makes the camera system of this invention very versatile.

What is claimed is:

1. A camera system comprising:
   a camera body;
   an interchangeable lens;
   a rear conversion lens interposed between the camera body and the interchangeable lens;
   focus detecting means for measuring luminous flux being transmitted through a focusing optical system to detect the amount of shift $\Delta Bf$ of an image surface between a predetermined focal surface and a surface where a subject is actually formed into an image;
   first information storing means for retaining a factor $K_0$ and another factor $C_0$, the factor $K_0$ being used for converting the amount of movement made by a specific image surface and being represented by a ratio of an extremely small amount of movement made by the image surface to an extremely small amount of movement made by the focusing optical system, the factor $C_0$ being used for correcting the factor $K_0$ in accordance with the amount of shift $\Delta Bf$ of the image surface;
   second information storing means, which is provided in the rear conversion lens, for retaining information regarding magnification $\beta c$ and focal length fc of the rear conversion lens;
   calculating means for converting the factor $K_0$ to a factor $K_0'$ with an equation in which $K_0'$ is a function of $K_0$ and $\beta c$ and for converting the factor $C_0$ to a factor $C_0'$ with an equation in which $C_0'$ is a function of $C_0$, $\beta c$, and fc; and
   control means for calculating the amount of movement $\Delta X$ made by the focusing optical system until the subject is focused, with an equation in which $\Delta X$ is a function of $K_0'$, $C_0'$, and $\Delta Bf$, and for driving controllably the focusing optical system by the amount of movement $\Delta X$.

2. A camera system according to claim 1, wherein the factor $K_0'$ is for converting the amount of movement made by the image surface of a composite, which composite includes the interchangeable lens and the rear conversion lens, and the factor $C_0'$ is for correcting the factor $K_0'$ and is calculated from the following equation:

$$C_0' = \frac{C_0}{\beta c^2} - \frac{1}{fc \cdot \beta c}.$$

3. A camera system according to claim 1, wherein the amount of movement $\Delta X$ made by the focusing optical system is calculated from the following equation $$\Delta X = \frac{\Delta Bf}{K_0' (1 + C_0' \cdot \Delta Bf)}.$$

4. A rear conversion lens interposed between a camera body and an interchangeable lens of a camera system, said camera system comprising:
   focus detecting means for measuring luminous flux being transmitted through a focusing optical system to detect the amount of shift $\Delta Bf$ of an image surface between a predetermined focal surface and a surface where a subject is actually formed into an image;
   first information storing means for retaining a factor $K_0$ and another factor $C_0$, the factor $K_0$ being used for converting the amount of movement made by a specific image surface and being represented by a ratio of an extremely small amount of movement made by the image surface to an extremely small amount of movement made by the focusing optical system, the factor $C_0$ being used for correcting the factor $K_0$ in accordance with the amount of shift $\Delta Bf$ of the image surface;

second information storing means, which is provided in the rear conversion lens, for retaining information regarding magnification $\beta c$ and focal length $fc$ of the rear conversion lens;

calculating means for converting the factor $K_0$ to a factor $K_0'$ with an equation in which $K_0'$ is a function of $K_0$ and $\beta c$ and for converting the factor $C_0$ to a factor $C_0'$ with an equation in which $C_0'$ is a function of $C_0$, $\beta c$, and $fc$; and control means for calculating the amount of movement $\Delta X$ made by focusing optical system until the subject is focused, with an equation in which $\Delta X$ is a function of $K_0'$, $C_0'$, and $\Delta Bf$, and for driving controllably the focusing optical system by the amount of movement $\Delta X$.

5. A rear conversion lens according to claim 4, wherein the factor $K_0'$ is for converting the amount of movement made by the image surface of a composite, which composite includes the interchangeable lens and the rear conversion lens, and the factor $C_0'$ is for correcting the factor $K_0'$ and is calculated from the following equation:

$$C_0' = \frac{C_0}{\beta c^2} - \frac{1}{fc \cdot \beta c}.$$

6. A rear conversion lens according to claim 4, wherein the amount of movement $\Delta X$ made by the focusing optical system is calculated from the following equation:

$$\Delta X = \frac{\Delta Bf}{K_0' (1 + C_0' \cdot \Delta Bf)}.$$

* * * * *